Figure 5:
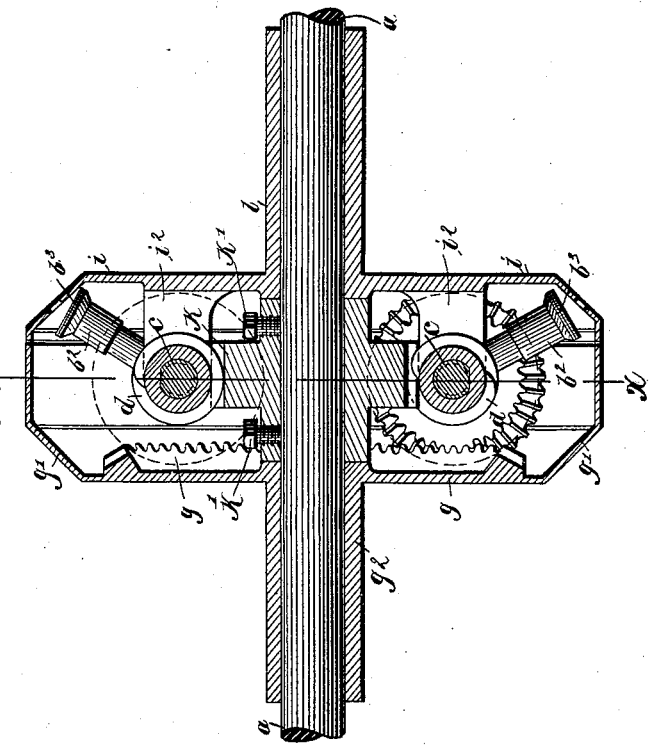

(No Model.) 6 Sheets—Sheet 1.
G. SHAW.
DIFFERENTIAL GEARING.
No. 479,108. Patented July 19, 1892.
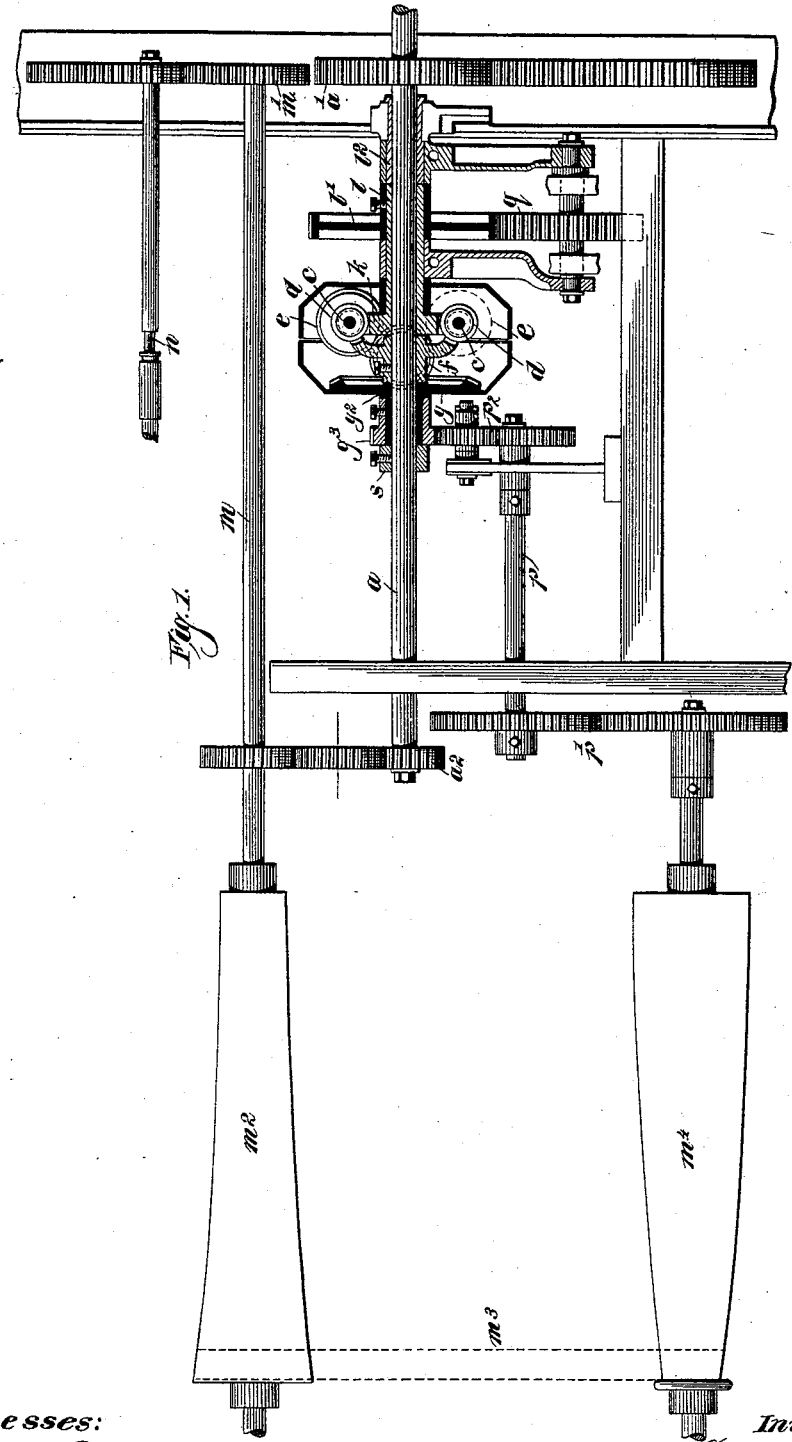
Fig. 1.
Witnesses:
H. G. Dieterich,
P. W. Sommers.
Inventor:
George Shaw,
By 
Atty.

(No Model.) 6 Sheets—Sheet 2.
G. SHAW.
DIFFERENTIAL GEARING.
No. 479,108. Patented July 19, 1892.
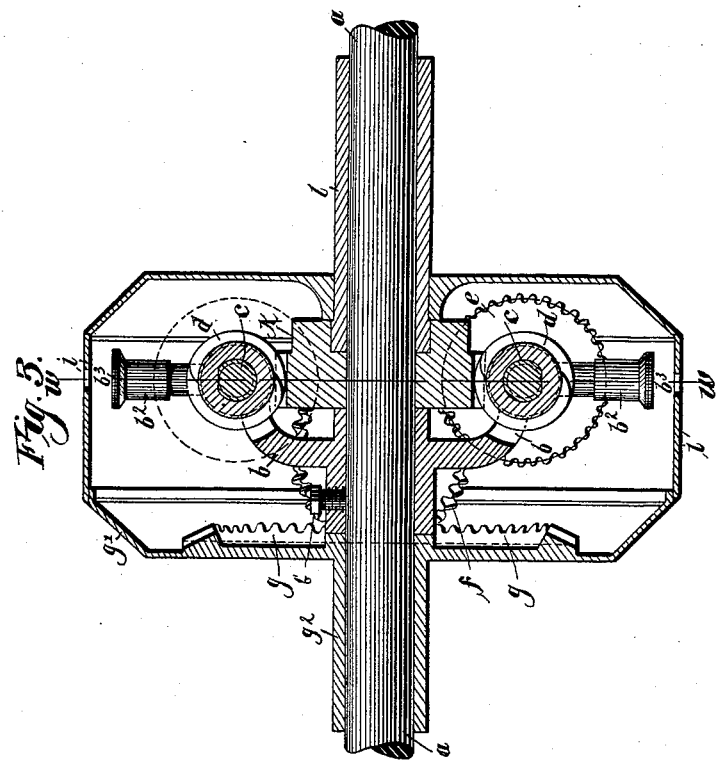
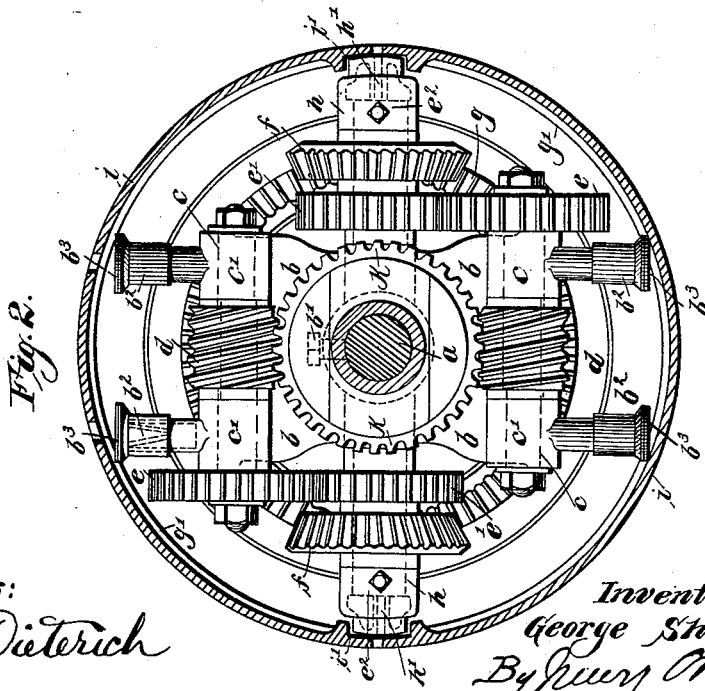
Witnesses:
H. G. Dieterich
J. W. Sommers
Inventor:
George Shaw,
By
Atty.

(No Model.) 6 Sheets—Sheet 3.

G. SHAW.
DIFFERENTIAL GEARING.

No. 479,108. Patented July 19, 1892.

Witnesses:
H. G. Dieterich
P. W. Sommers

Inventor:
George Shaw,
By Henry Orth
Atty.

(No Model.) 6 Sheets—Sheet 4.

G. SHAW.
DIFFERENTIAL GEARING.

No. 479,108. Patented July 19, 1892.

Witnesses:
H. G. Dieterich
B. W. Sommer

Inventor:
George Shaw
By [signature]
Atty.

(No Model.) 6 Sheets—Sheet 5.

G. SHAW.
DIFFERENTIAL GEARING.

No. 479,108. Patented July 19, 1892.

Witnesses:
H. G. Dieterich
C. W. Sommers

Inventor:
George Shaw
By Henry Orth
Atty.

(No Model.) 6 Sheets—Sheet 6.

G. SHAW.
DIFFERENTIAL GEARING.

No. 479,108. Patented July 19, 1892.

Witnesses:
H. G. Dieterich
P. H. Sommers

Inventor:
George Shaw,
By [signature]
Atty.

United States Patent Office.

GEORGE SHAW, OF MANCHESTER, ENGLAND, ASSIGNOR OF ONE-HALF TO SAMUEL HERBERT BROOKS, OF SAME PLACE.

DIFFERENTIAL GEARING.

SPECIFICATION forming part of Letters Patent No. 479,108, dated July 19, 1892.

Application filed December 4, 1891. Serial No. 414,019. (No model.) Patented in England November 26, 1890, No. 19,248, and in Belgium September 4, 1891, No. 96,291.

*To all whom it may concern:*

Be it known that I, GEORGE SHAW, draftsman, a subject of the Queen of Great Britain, residing at Manchester, in the county of Lancaster, England, have invented certain new and useful Improvements in Differential Gearing, (for which I have obtained Letters Patent in England, No. 19,248, dated November 26, 1890, and in Belgium, No. 96,291, dated September 4, 1891;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention has relation to differential gearing generally, and specifically to such gearing in its use with slubbing, intermediate, and roving frames for preparing fibrous materials for imparting the necessary variable speed of rotation to the bobbins or to the spindles of such frames in winding the twisted sliver as it is produced.

In the differential gear heretofore used in machines of the class referred to for the purposes stated there is a constant overstrain on the belt that drives one of the cones or cone-drums, even when it revolves at the same speed as the main driving-shaft. For this reason the belts for the cone-drums of these machines are a great source of trouble, and they are usually overtaxed to such an extent as to cause uncertain and irregular driving.

My invention has for its object the provision of means whereby the difficulty referred to is effectually obviated. This I attain by making the main driving-shaft the basis or fulcrum from which the increased or decreased speed is to be transmitted and by employing for this purpose worm-gearing or helically-toothed gearing, the arrangement of which may be variously modified, as will appear hereinafter, without departing from the nature of my invention, which consists, first, of a differential gearing comprising, essentially, a main driving-shaft, a worm or helically-toothed gearing, one of whose elements revolves with the shaft and the other of which has independent rotation thereon, an auxiliary driving-shaft rotated by the main shaft, means for varying the speed of said auxiliary shaft, and transmitting devices for transmitting the rotary motion of the auxiliary shaft to the independently-revoluble element of the worm or helically-toothed gear through the element thereof that revolves with the main shaft; secondly, the invention consists in the combination of the differential gearing with the main driving-shaft of a slubbing, intermediate, or roving frame for imparting a variable speed to the bobbins or their spindles, according as either of them lead, and, lastly, the invention consists in details of construction and combinations of co-operating elements, as will now be fully described, reference being had to the accompanying drawings, in which—

Figure 4:
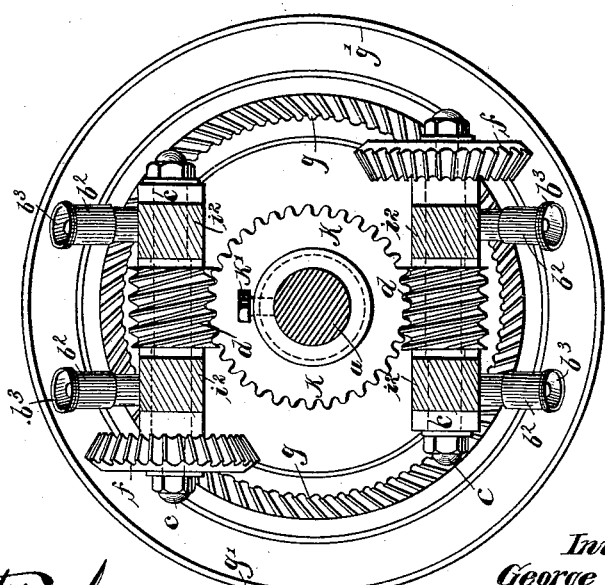
Figure 5:
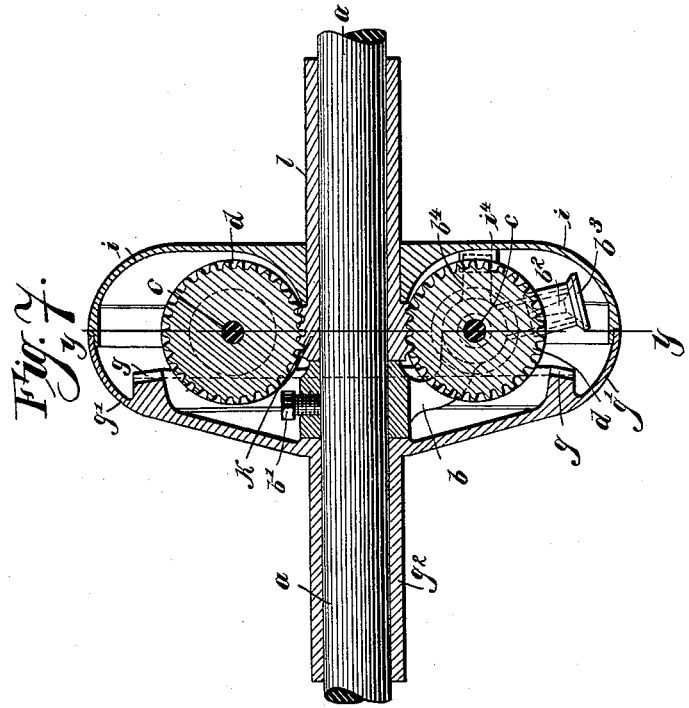
Figure 8:
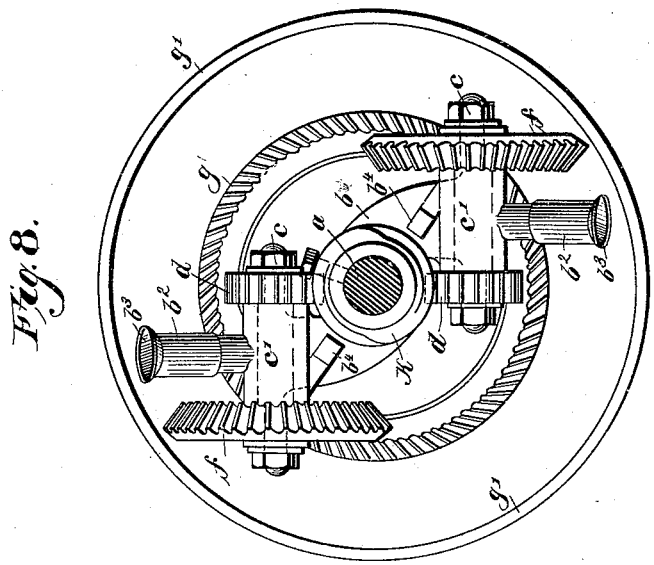

Figure 1 is a sectional elevation of a slubbing, intermediate, or roving frame of well-known construction having a differential gearing of the preferred construction and embodying my invention applied to and combined with the main driving-shaft. Figs. 2 and 3 are vertical sectional views, taken at right angles to each other, the former being taken on or about on line $w\ w$ of Fig. 3, looking from right to left, of the said preferred form of differential gearing. Figs. 4, 6, and 8 are views similar to Fig. 2, the sections being taken on or about on lines $x\ x$, $y\ y$, and $z\ z$ of Figs. 5, 7, and 9, respectively, which last-named figures are sectional views taken at right angles to Figs. 4, 6, and 8, respectively. Fig. 10 is a view similar to Fig. 1, illustrating the differential gear shown in Figs. 6 and 7 applied to the main driving-shaft.

Referring now to Fig. 1, which shows a well-known form of slubbing, intermediate, and roving frame, and with the main driving-shaft of which is combined the preferred arrangement of differential gearing shown in Figs. 2 and 3, to which reference is also had, $a$ indicates the main driving-shaft; $a'$, the driving-gearing; $a^2$, the gearing that transmits the rotary motion of the main driving-shaft to the driving cone-drum $m^2$, whose rotation is transmitted to the driven cone-drum $m^4$ by a belt $m^3$, the latter cone imparting motion to the differential gearing through the transmitting-gearing $p'\ p\ p^2$ and the driving-pinion $q^3$ for said differential gearing, $m$ being the shaft and $m'$ the gearing that drives the rollers $n$.

All of the described mechanisms are of any usual or preferred arrangement, and their operation will be readily understood by all those conversant with this class of machines and will require no further description.

The preferred form of differential gearing combined with the main driving-shaft $a$ consists of a casting $b$, secured to the said shaft in any desired manner—as, for instance, by a set-screw or bolt $b'$. The casting $b$ has at opposite ends bearings $c'$ for the journals or the spindles $c$ of two worms $d$, that abut against the said bearings to hold them against endwise motion. Each worm-spindle has secured to one end a pinion $e$, that gears with a pinion $e'$, each of said pinions $e'$ being mounted on a stud $e^2$, projecting from the casting $b$, in the plane of the axis of the main shaft $a$ and at right angles thereto, or parallel with the worm-spindles $c$. Each of said studs also carries a bevel-pinion $f$, keyed or otherwise secured to or formed integral with the wheel $e'$ and engaging with a bevel-wheel $g$, that is loose on the shaft $a$ and to the sleeve $g^2$ of which is secured the pinion $g^3$, that is driven from the driven cone-drum $m^4$ and transmitting-gearing above described. The worms $d$ are in gear with a worm-wheel $k$, loose on shaft $a$, said worm-wheel being the transmitting-wheel that serves to transmit the differential rotation of the described gearing to the bobbins by means of a gear-wheel $l'$ on a transmitting-sleeve $l$, that is connected with the hub of the worm-wheel $k$ in any suitable or preferred manner. This gear-wheel $l'$ meshes with a similar wheel $q$, that is journaled in hangers loosely mounted on the sleeve $l$ and on a bushing $l^2$ in the bearing for the main driving-shaft, which bushing and hanger-bearings hold the parts against endwise motion on said shaft, as shown in Fig. 1, the gearing (of ordinary construction and arrangement) for transmitting the rotation of wheel $q$ to the bobbins having been omitted from the drawings, as it forms no part of my invention, except incidentally, and because it is well known.

From what has been said it will be seen that those elements of the differential gear which revolve with shaft $a$ are duplicated and so arranged on opposite sides of said shaft as to counterbalance each other for the purpose of neutralizing centrifugal action, and inasmuch as said gearing revolves with the shaft the usual fly-wheel can be dispensed with, the gearing acting as a fly-wheel.

For purposes of lubrication the outer ends of the short studs have oil-cups secured thereto in the form of a hollow cap $h$, and the bearings for the worm spindles or journals have likewise oil-cups $b^2$ formed thereon, said oil-cups having a tapering or very narrow feed-duct, as indicated in dotted lines at $h'$ and $b^3$, Fig. 2. In fact, they are constructed upon the principle of the ink-bottle from which the ink will not spill when upset.

In order to protect the differential gear, it is inclosed in a housing or casing that revolves about the main driving-shaft $a$ and is made in two sections $i$ and $g'$. The section $i$ is loosely mounted on the transmitting-sleeve $l$ and has two recesses $i'$, diametrically opposite each other, into which project the oil cups or caps $h$ for the studs that carry the gears $e'\ f$, whereby said section is caused to revolve with the gearing about the shaft $a$. The section $g'$ of the casing may be secured to the drive-wheel $g$, its edges fitting into the section $i$; but I preferably form said section $g'$ integral with the drive-wheel $g$, as shown in Fig. 3.

By means of the described construction access is readily had to the differential gearing when this becomes necessary from any cause, as it is simply necessary to loosen the set-screw that locks the confining-sleeve $s$, Fig. 1, to the main shaft $a$, when pinion $q^3$ and wheel $g$ may be moved along said shaft in one direction, and by loosening the set-screw $b'$ the casting $b$ may then be moved along the shaft out of section $i$ of the casing.

In order to supply the oil-cups $h$ and $b^2$ with oil, the section $i$ of casing is provided with suitable apertures in register with the feed-passages in said cups, as shown.

Figure 6:
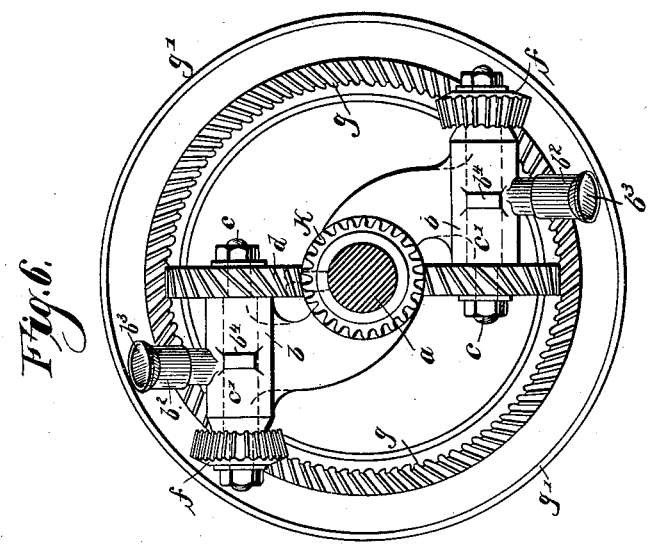

Referring now to Figs. 4 and 5, which illustrate one modification of the differential gear, it will be seen that in this construction the transmitting worm-wheel $k$ has a hub on each side and is secured to the main driving-shaft by means of set bolts or screws $k'$ instead of being loose thereon. The bearings $c'$ for the worm-spindles $c$ are formed in bracket-arms $i^2$, secured to or formed on the casing-section $i$, which in this construction is rigidly secured or preferably forms an integral part of the transmitting-sleeve $l$. The oil-cups $b^2$ for the worm-spindles $c$ are, as shown, inclined toward the right to bring them closer to the casing-section $i$ to facilitate the feeding of the lubricant thereto. The worms $d$ on spindles $c$ gear with the worm $k$, as explained in reference to Figs. 2 and 3. In this modification the bevel-wheels $f$ are, however, secured to the spindles $c$ of the worms $d$ and gear with a skew instead of a bevel wheel $g$, that revolves freely on the main driving-shaft, thus dispensing with the gearing $e$ and the casting $b$ described in reference to said Figs. 2 and 3, the mechanism being simplified and yet counterbalanced on the main driving-shaft. The skew-wheel $g$ has also the portion $g'$ of the inclosing casing or housing formed thereon.

Referring now to Figs. 6 and 7, which show a further modification, as well as a further simplification, in the gearing, the casting $b$ in this construction is also secured to and revolves with the main driving-shaft, and the transmitting-sleeve $l$ forms an integral part of a helically-threaded wheel $k$ instead of a worm-wheel, said helically-threaded wheel $k$ being loose on main shaft $a$, as described in reference to Figs. 1 and 2, and gearing with two helically-threaded wheels $d$ instead of two worms on spindles $c$, that have their bearings in the casting $b$. Each of the spindles $c$ carries a helically-threaded bevel-pinion $f$, in gear with a helically-threaded wheel $g$. On the bearings for the spindles $c$ is formed a lug or projection $b^4$, that engages a like lug or projection $i^4$ on the casing-section $i$, by means of which the said casing-section $i$ is revolved with the gearing, the section $g'$ of the casing forming here also an integral part of the wheel $g$. In this form of differential gear the helically-toothed wheel $k$ becomes the drive-wheel and the helically-toothed wheel $g$ the transmitting-wheel for transmitting variable speed to the bobbins, the sleeve $l$ carrying the driving-pinion $g^3$ and the sleeve $g^2$ the driven gear $l'$. When the wheel $k$ revolves with and at the same speed as the main driving-shaft $a$, it will impart a like speed to the helically-toothed wheel $g$, and consequently if this speed is varied by speeding the driven cone-drum $m^4$ a corresponding variation in speed will be imparted to the wheel $g$, and consequently to the bobbins.

Figure 9:
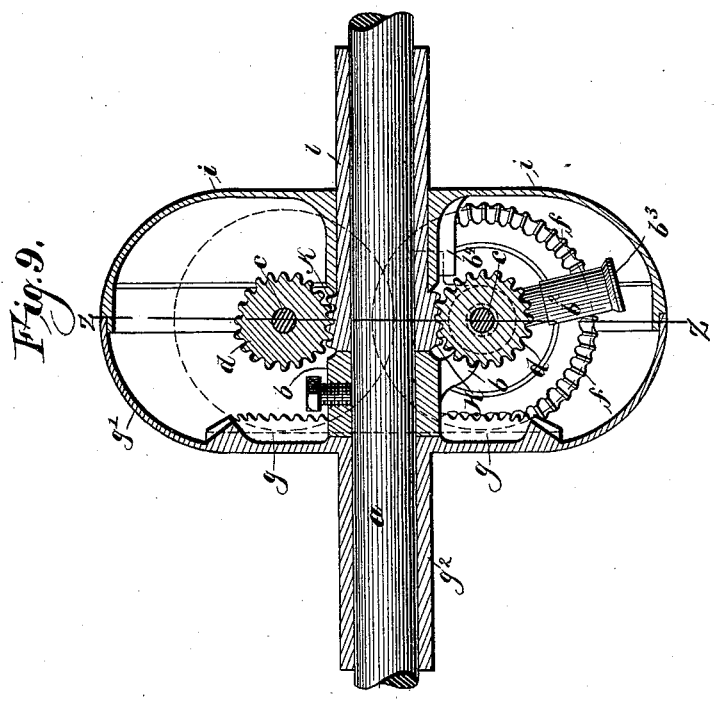
Figure 10:
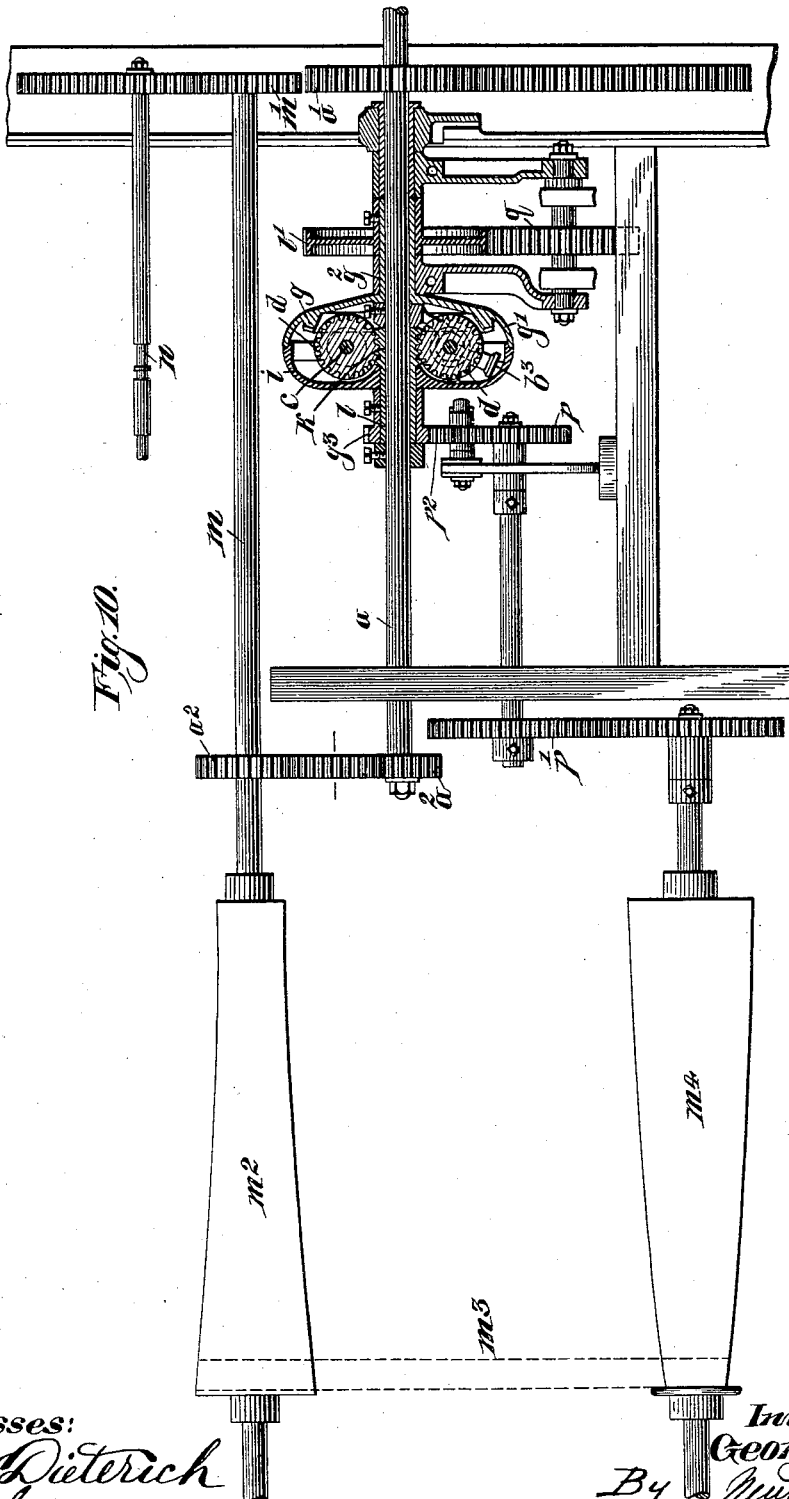

In Figs. 8 and 9 I have shown a further modification in the arrangement of the gearing, which is somewhat similar to that described in reference to Figs. 6 and 7, except that a worm-gearing $k\ d$ is here again substituted for the corresponding helically-toothed gearing shown in said figures and that the worms $d$ are smaller and the bevel-wheels $f$, that gear with the helically-toothed wheel $g$, are larger than the corresponding wheels shown in said Figs. 6 and 7; but the operation is the same. Inasmuch as the wheel $k$ in the modifications shown in Figs. 6 to 9 is the driving-wheel, it will be understood that the position of the differential gearing on the main shaft $a$ is reversed relatively to the position of the gearing shown in Fig. 1, so that pinion $g^3$, now on sleeve $l$, will gear with the driving-pinion and so that wheel $l'$, now on sleeve $g^2$, will gear with the transmitting-wheel $q$, as shown in Fig. 10, in which the form of differential gearing shown in Figs. 6 and 7 is applied to the main driving-shaft and from which the application to said shaft of the modified form of differential gear shown in Figs. 8 and 9 will be readily understood.

Although it is preferred to employ two spindles $c$ on opposite sides of the main shaft for reasons stated, one only, or, if preferred, more than two, may be employed. In the latter case the connecting-gearing will of course be correspondingly multiplied.

The mechanism described in respect to Figs. 1 to 5, inclusive, will drive the wheel $l'$ at the speed of the main shaft when the wheel $g$ is at liberty, because any resistance to the rotation of said wheel $l'$ cannot act to rotate the worms $d$ and their spindles $c$, which can only be rotated by locking wheel $g$ against rotation with shaft $a$ or by rotating the said wheel at a different speed from that of shaft $a$.

In the modifications shown in Figs. 8 and 9, in which the wheel $g$ drives the wheel $l'$, and through the latter the bobbins, their resistance to the rotation of the wheel $g$ cannot cause the spindles $c$ to revolve, because the worms $d$ are in gear with worm-wheel $k$ on shaft $a$, which wheel $k$ must be locked against rotation with the said shaft or rotated at a different speed from that of the shaft to impart a differential rotation to said sleeve $g^2$.

In the modification shown in Figs. 6 and 7 the resistance to the rotation of the sleeve $g^2$ by having to drive the bobbins would act more or less to rotate the spindles $c$ and wheel $k$. This, however, depends upon the angle of the helically-toothed wheels.

In some frames or machines of the class described the spindles "lead" the bobbins—that is to say, the latter are caused to revolve at a less speed than their spindles—while in others the bobbins lead the spindles, and in the arrangement of the described differential gear the bobbins are supposed to lead the spindles; but by reversing the angle of the worm or helical gears or by changing the spur-wheels $e$, Figs. 1, 2, and 3, to the opposite ends of the spindles $c$ the described differential gearing may be applied to frames in which the spindles are to lead the bobbins.

It is evident from the above description that the various forms of differential gearing referred to embody each and every one the same principle or operation—namely, making the main driving-shaft the fulcrum or basis from which the variable speed is to be transmitted to the bobbins and employing worm or helically-threaded gearing for transmitting this variable speed, whereby the driving-belt for the cone-drums is entirely relieved of undue strain and irregular driving resulting in the production of an uneven sliver is avoided, as well as undue wear of said driving-belt and of the mechanism.

Having thus described my invention, what I claim as new therein, and desire to secure by Letters Patent, is—

1. The combination, with a revoluble shaft, of a differential gearing comprising a gearing, as a worm-gearing, one element of which revolves with the shaft and the other of which has independent rotation thereon, a driving-gear on and adapted to revolve at a different speed from that of the shaft, and a transmitting-gear for transmitting the rotary motion of the driving-gear to the independently-revoluble element of the gearing through the like element that revolves with the shaft, for the purpose set forth.

2. The combination, with a revoluble main driving-shaft, of a differential gearing comprising a gearing, as a worm-gearing, one of whose elements revolves with the shaft and the other of which has independent rotation thereon, an auxiliary driving-shaft rotated by the main shaft, means for varying the speed of rotation of said auxiliary shaft, and transmitting-gearing for transmitting the rotary motion of the auxiliary shaft to the independently-revoluble element of the worm or helically-toothed gear through the element that revolves with the main driving-shaft, for the purpose set forth.

3. The combination, with a revoluble shaft, of a differential gear comprising a gear, as a worm-gearing, adapted to revolve in bearings secured to the shaft, a driving-gear revoluble on and at a different speed from that of the shaft for driving said worm or helically-toothed gear, and a transmitting-gear for transmitting the rotation of the worm or helically-toothed gear, for the purpose set forth.

4. The combination, with a revoluble main driving-shaft, of a differential gearing comprising a gear, as a worm-gear, mounted in bearings secured to the main shaft and adapted to revolve on its own axis, a like gear on and revolving independently of said main shaft and meshing with the gear secured thereto, an auxiliary driving-shaft rotated by the main shaft, means for varying the speed of said auxiliary shaft, and transmitting-gearing operated by the auxiliary shaft for transmitting the rotary motion thereof to the independently-revoluble gear on the main shaft through the gear secured thereto, for the purpose set forth.

5. The combination, with a revoluble shaft, of a differential gear comprising a gearing, as a worm-gearing, one element of which revolves with the shaft and the other of which has independent rotation thereon, a driving-gear on and adapted to revolve at a different speed from that of the shaft, a transmitting-gear for transmitting the rotary motion of the driving-gear to the independently-revoluble element of the gearing through the element thereof that revolves with the shaft, and a two-part casing or housing for said gear respectively connected with the differential gear, so as to rotate therewith at the same speed, for the purpose set forth.

6. The combination, with the shaft $a$, the worm-wheel $k$, loose thereon, the worms $d$, in gear with worm $k$ and revoluble in bearings secured to the shaft, the gear-wheels $e$ on the worm-spindles, the gear-wheels $e'$, in gear with wheels $e$ and revoluble on bearings also secured to the shaft $a$, and the bevel-wheels $f$, revoluble with the gear-wheels $e'$, of the wheel $g$, loose on shaft $a$ and in gear with bevel-wheels $f$, substantially as and for the purpose set forth.

7. In a differential gear such as described, the combination of the wheel $g$, having a housing-section $g'$ formed thereon, the transmitting-sleeve $l$, the housing-section $i$, loosely mounted thereon and fitting onto section $g'$, and the studs or short shafts $e^2$, projecting into recesses $i'$, formed in said housing-section $i$, substantially as and for the purpose set forth.

8. The combination, with the main driving-shaft of a slubbing, intermediate, or roving frame, the cone-drums, and the wheel $q$, of a differential gear comprising a gearing, as a worm-gearing, one element of which revolves with the main driving-shaft, the other having independent rotation thereon, a driving-wheel on and revoluble independently of said main driving-shaft, intermediate gearing operated by the driven cone-drum and operating the driving-wheel, transmitting-gear for transmitting the rotary motion of said driving-wheel to the independently-revoluble element of the differential gear through that element thereof which revolves with the driving-shaft, and transmitting-gearing for transmitting the rotary motion of said independently-revoluble element of the differential gear to the wheel $q$, for the purpose set forth.

GEORGE SHAW.

Witnesses:
 PETER J. LIVSEY,
 WILLIAM FAULKNER.